(12) United States Patent
Aihara (10) Patent No.: US 11,663,035 B2
(45) Date of Patent: May 30, 2023

(54) AGENT CONTROL DEVICE (71) Applicant: TOYOTA JIDOSHA KABUSHIKI KAISHA, Toyota (JP)

(72) Inventor: Satoshi Aihara, Tokyo (JP)

(73) Assignee: TOYOTA JIDOSHA KABUSHIKI KAISHA, Toyoto (JP)

(*) Notice: Subject to any disclaimer, the term of this patent is extended or adjusted under 35 U.S.C. 154(b) by 24 days.

(21) Appl. No.: 17/225,682

(22) Filed: Apr. 8, 2021

(65) Prior Publication Data
US 2021/0357253 A1  Nov. 18, 2021

(30) Foreign Application Priority Data

May 18, 2020 (JP) .............................. JP2020-087036

(51) Int. Cl.
*G06F 9/48* (2006.01)
*G06F 21/62* (2013.01)

(52) U.S. Cl.
CPC ........ *G06F 9/4812* (2013.01); *G06F 21/6218* (2013.01)

(58) Field of Classification Search
CPC ........................... G06F 9/4812; G06F 21/6218
See application file for complete search history.

(56) References Cited

U.S. PATENT DOCUMENTS

| | | | | |
|---|---|---|---|---|
| 5,655,096 A | * | 8/1997 | Branigin ............... | G06F 9/3857 712/E9.061 |
| 5,923,627 A | * | 7/1999 | Miwa ................... | G11B 27/005 386/E9.013 |
| 2010/0242041 A1 | * | 9/2010 | Plondke ................ | G06F 9/4812 718/103 |
| 2010/0332235 A1 | | 12/2010 | David | |
| 2011/0016247 A1 | * | 1/2011 | Ohmasa ................ | G06F 13/26 710/264 |
| 2012/0131309 A1 | * | 5/2012 | Johnson .................... | G06F 8/40 712/E9.004 |

(Continued)

FOREIGN PATENT DOCUMENTS

JP     2018-189984 A     11/2018

OTHER PUBLICATIONS

Satoshi Aihara, U.S. Appl. No. 17/225,624, filed Apr. 8, 2021.

(Continued)

*Primary Examiner* — Henry Tsai
*Assistant Examiner* — John B Roche
(74) *Attorney, Agent, or Firm* — Sughrue Mion, PLLC (57) ABSTRACT

An agent control device configured to execute a plurality of agents and including a processor, the processor being configured to: request execution of each of the agents at a prescribed trigger; store an interruptibility list that stipulates interruptibility of execution for each function of a given agent being executed or for an execution status of the given agent; reference the interruptibility list in order to set permissibility information relating to executability of another one of the agents in conjunction with execution of the given agent; and perform management such that, in a case in which there is a request for execution of the other agent while the given agent is executing and the permissibility information indicates that the other agent is not executable, execution of the given agent continues without responding to the request.

5 Claims, 10 Drawing Sheets (56) References Cited

U.S. PATENT DOCUMENTS

| | | |
|---|---|---|
| 2013/0103872 A1* | 4/2013 | Ho .................... G06F 9/5033 710/269 |
| 2014/0282003 A1 | 9/2014 | Gruber et al. |
| 2015/0139441 A1 | 5/2015 | Kawalkar |
| 2016/0322048 A1 | 11/2016 | Amano et al. |
| 2017/0257345 A1 | 9/2017 | Westra et al. |
| 2019/0279620 A1 | 9/2019 | Talwar et al. |
| 2020/0320994 A1 | 10/2020 | Totsuka et al. |
| 2021/0117479 A1 | 4/2021 | Liu et al. |

OTHER PUBLICATIONS

Non-Final Office Action dated Dec. 6, 2022 issued by the United States Patent and Trademark Office in U.S. Appl. No. 17/225,624.
Final Office Action dated Mar. 20, 2023 in the U.S. Appl. No. 17/225,624.

* cited by examiner

| PROPRIETARY AGENT FUNCTION | PHONE CALL | PAYMENT | WEATHER AND NEWS ACQUISITION | VEHICLE INFORMATION ACQUISITION | DESTINATION SEARCH |
|---|---|---|---|---|---|
| INTERRUPTIBILITY | NOT PERMITTED | NOT PERMITTED | PERMITTED | PERMITTED | PLACE ON HOLD |

| LEVEL | INTERRUPTIBILITY | SHOPPING | DRIVE ASSISTANCE |
|---|---|---|---|
| LEVEL A | INTERRUPTION NOT PERMITTED | PAYMENT PROCESSING | WARNING IN PROGRESS |
| LEVEL B | PLACE ON HOLD | PURCHASE PROCEDURE | DANGER PREDICTED |
| LEVEL C | INTERRUPTION PERMITTED | PRODUCT SEARCH | NORMAL DRIVING |

FIG.10

AGENT CONTROL DEVICE

CROSS-REFERENCE TO RELATED APPLICATION

This application is based on and claims priority under 35 USC 119 from Japanese Patent Application No. 2020-087036 filed on May 18, 2020, the disclosure of which is incorporated by reference herein.

BACKGROUND

Technical Field

The present disclosure relates to an agent control device to execute processing relating to an agent in response to a user request.

Related Art

Japanese Patent Application Laid-Open (JP-A) No. 2018-189984 discloses a voice interaction agent that receives an input audio signal, performs speech recognition processing on the input audio signal, and determines which agent to use to perform processing according to the input audio signal based on both the result of the speech recognition processing and agent information.

Certain functions, such as a phone call function and a payment processing function, need continuity due to the nature of the service and also from a security perspective. This makes it undesirable to temporarily interrupt or end a session by starting up another agent while the session is being executed by a given agent.

SUMMARY

An object of the present disclosure is to provide an agent control device capable of suppressing another agent being started up while a given agent is executing, which would interrupt the given agent.

An agent control device of a first aspect is configured to execute plural agents. The agent control device includes a request section configured to request execution of each of the agents at a prescribed trigger, a storage section configured to store an interruptibility list that stipulates interruptibility of execution for each function of a given agent being executed or for an execution status of the given agent, a setting section configured to reference the interruptibility list in order to set permissibility information relating to executability of another one of the agents in conjunction with execution of the given agent, and a management section. The management section is configured to perform management such that, in cases in which there is a request from the request section for execution of the other agent while the given agent is executing and the permissibility information indicates the other agent is not executable, execution of the given agent continues without responding to the request.

The agent control device of the first aspect is capable of executing the plural agents. The storage section of the agent control device stores the interruptibility list that stipulates the interruptibility of execution either for each function of the given agent being executed or for the execution status of the given agent. In this agent control device, the request section requests execution of each of the agents at a prescribed trigger, and the setting section references the interruptibility list in order to set the permissibility information relating to executability of the other agent in conjunction with execution of the given agent is executing. Examples of the "prescribed trigger" include an utterance from a user into a microphone, or the pressing of push-to-talk (PTT) switch.

In cases in which there is a request for execution of the other agent while the given agent is executing and the permissibility information indicates the other agent is not executable, the management section performs management such that execution of the given agent continues.

This agent control device is thereby capable of suppressing start-up of the other agent while the given agent is executing, which would interrupt the given agent.

An agent control device of a second aspect is the agent control device of the first aspect, wherein an indicator of uninterruptibility is stipulated in the interruptibility list for a function of the given agent requiring continuity. The setting section sets the permissibility information at a start of execution of an uninterruptible function in the interruptibility list such that the other agent is not executable, and the setting section sets the permissibility information at a finish of execution of the uninterruptible function such that the other agent is executable.

In the agent control device of the second aspect, a function of the given agent requiring continuity is not interrupted during execution. For example, this agent control device thereby suppresses interruption of a phone call while the given agent is executing the phone call, and suppresses interruption of payment processing while the given agent is executing payment processing.

An agent control device of a third aspect is the agent control device of either the first aspect or the second aspect, wherein the permissibility information is configured by a flag, and interruptibility is stipulated for each function of the given agent in the interruptibility list.

The agent control device of the third aspect enables centralized management of plural agents with different functions by switching the flag ON or OFF.

An agent control device of a fourth aspect is the agent control device of either the first aspect or the second aspect, wherein the permissibility information is configured by a level that changes according to the execution status of the given agent, and interruptibility is stipulated according to the level in the interruptibility list.

The agent control device of the fourth aspect enables interruptibility to be managed according to the execution status of the function being executed by the agent.

An agent control device of a fifth aspect is the agent control device of any one of the first aspect to the fourth aspect, wherein in cases in which there is a request from the request section for execution of the other agent while the given agent is executing and the permissibility information indicates that the other agent is not executable, the management section places the request on hold, allows the given agent to continue, and causes execution of the other agent in response to the request that was placed on hold after execution has finished for the given agent that was allowed to continue executing.

The agent control device of the fifth aspect does not discard the execution request for the other agent even in a case in which the other agent is not executable while the given agent is executing, and instead places the request on hold. This agent control device accordingly enables the other agent to be executed after the given agent has finished, without having to re-request the other agent.

The present disclosure is capable of suppressing the other agent being started up while the given agent is executing, which would interrupt the given agent.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
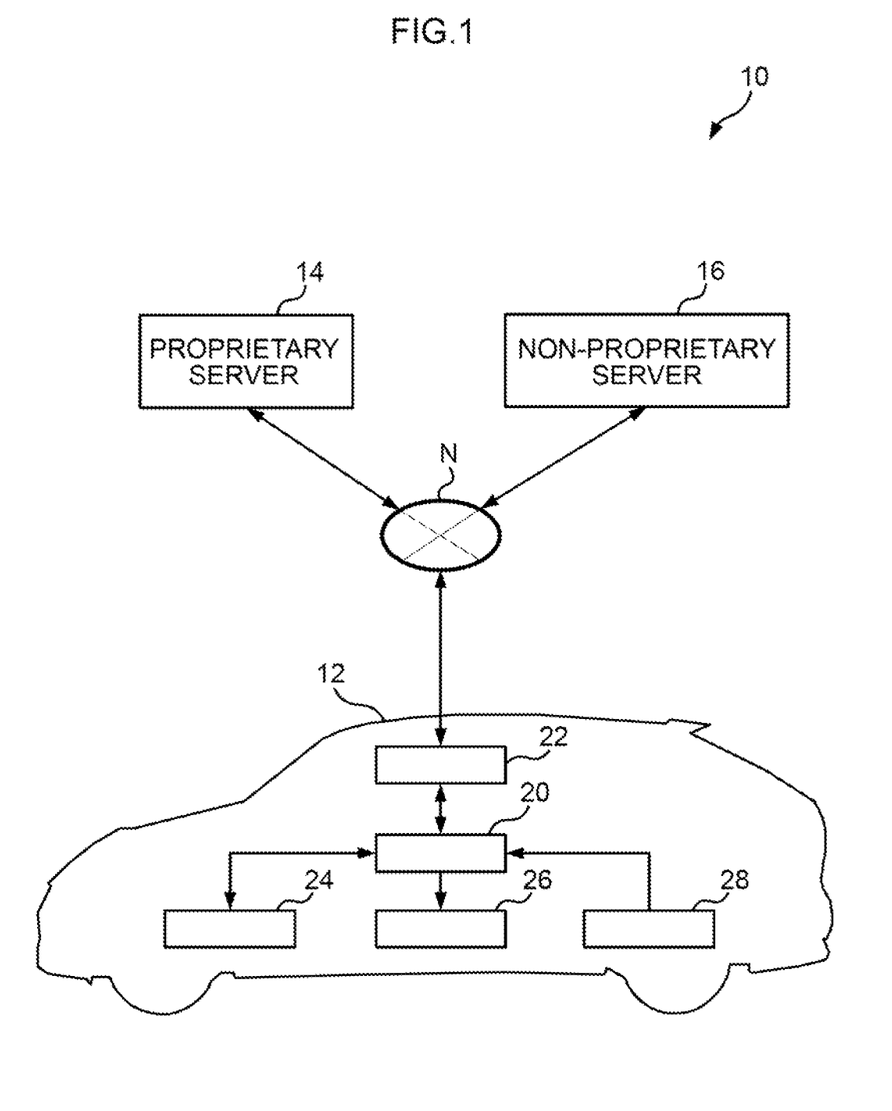
FIG. 1 is a diagram illustrating a schematic configuration of an agent system according to a first exemplary embodiment.
Figure 2:
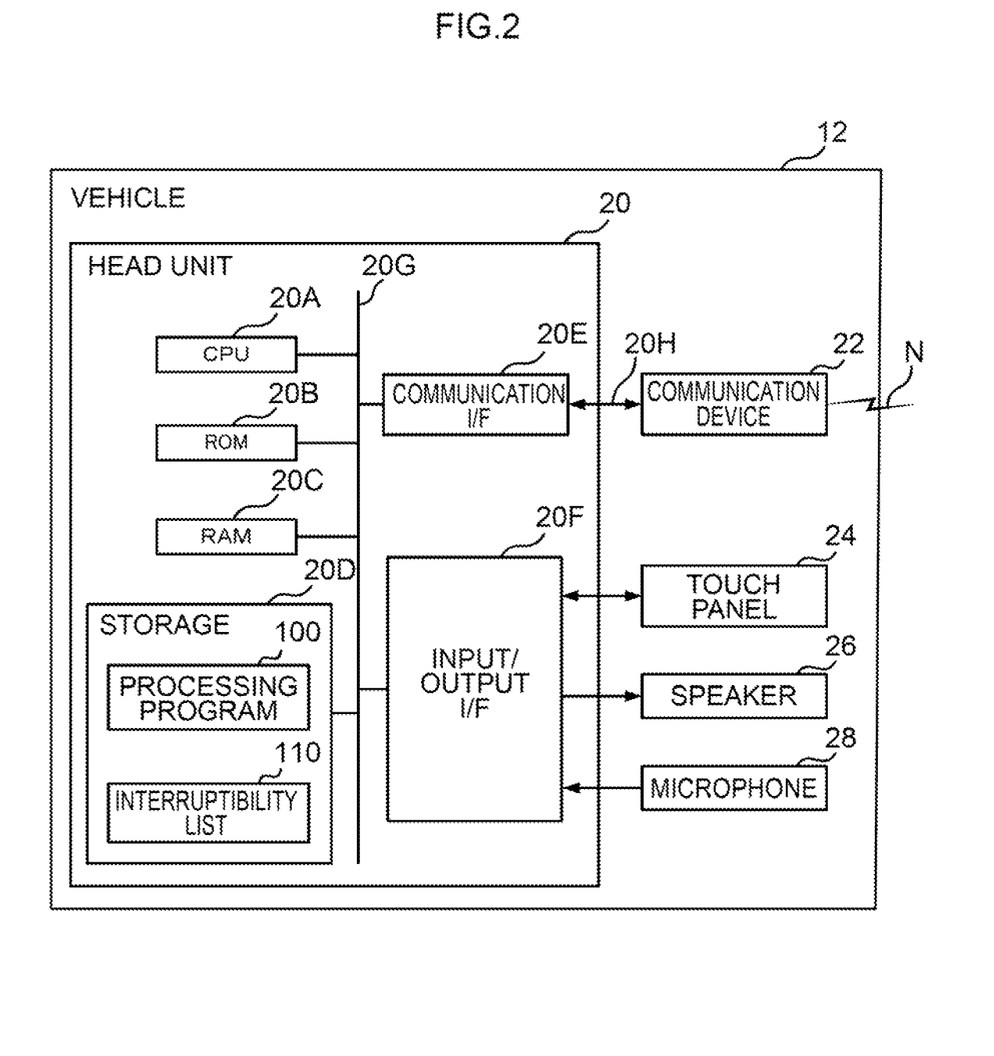
FIG. 2 is a block diagram illustrating hardware configuration of a vehicle of the first exemplary embodiment.

As illustrated in FIG. 1 and FIG. 2, an agent system 10 of a first exemplary embodiment is configured including a vehicle 12, a proprietary server 14, and a non-proprietary server 16. A head unit 20 serving as an agent control device, a communication device 22, a touch panel 24, a speaker 26, and a microphone 28 are installed in the vehicle 12. The communication device 22 of the vehicle 12, the proprietary server 14, and the non-proprietary server 16 are connected together over a network N.

The proprietary server 14 is a server belonging to the original manufacturer of the vehicle 12. The proprietary server 14 includes a function to surmise the intent of an utterance of a user U intended to cause implementation of a function of a proprietary agent, which is a service of the vehicle manufacturer. The proprietary agent includes functions relating to phone calls, payments, weather and news acquisition, vehicle information acquisition, destination search, requests for assistance, and the like. The proprietary agent is an example of a given agent.

The non-proprietary server 16 is a server belonging to an organization other than the manufacturer of the vehicle 12. The non-proprietary server 16 includes a function to surmise the intent of an utterance of the user U intended to cause implementation of a function of a non-proprietary agent, which is a service of the other organization. The non-proprietary agent includes functions relating to music provision, audiobooks, phone calls, weather and news acquisition, and the like. The non-proprietary agent is an example of another agent. Note that the proprietary agent and the non-proprietary agent may implement similar types of function to each other.

Vehicle

As illustrated in FIG. 2, the head unit 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E, and the input/output I/F 20F are connected together so as to be capable of communicating through an internal bus 20G. The CPU 20A is an example of a processor, and the RAM 20C is an example of memory.

The CPU 20A is a central processing unit that executes various programs and controls various sections. Namely, the CPU 20A reads a program from the ROM 20B or the storage 20D, and executes the program using the RAM 20C as a workspace.

The ROM 20B stores various programs and various data. The ROM 20B of the present exemplary embodiment stores a control program to control the head unit 20.

The RAM 20C serves as a workspace to temporarily store programs and data.

The storage 20D serves as a storage section configured by a hard disk drive (HDD) or a solid state drive (SSD), and stores various programs and various data. The storage 20D of the present exemplary embodiment stores a processing program 100 and an interruptibility list 110.

The processing program 100 is a program for controlling the proprietary agent and the non-proprietary agent.

Figure 3:
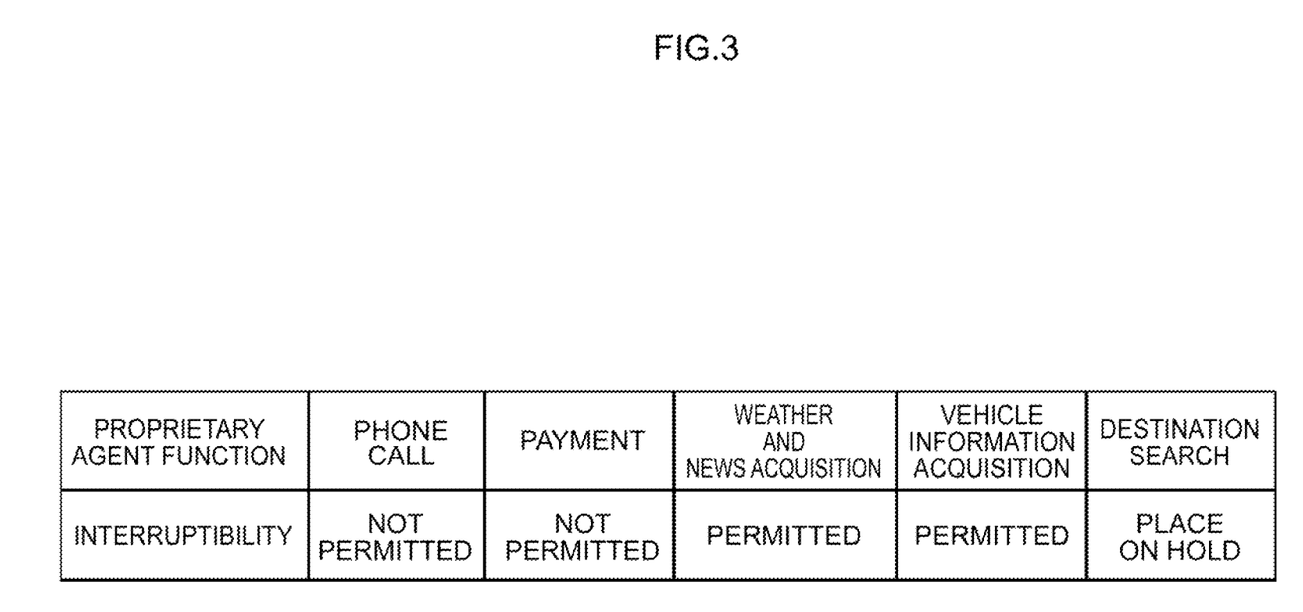
FIG. 3 is a diagram illustrating content of an interruptibility list of the first exemplary embodiment.

As illustrated in FIG. 3, the interruptibility list 110 is a list stipulating whether or not it is permissible to interrupt a given function of the proprietary agent while the function is executing. The interruptibility list 110 stipulates that functions of the proprietary agent that need continuity are uninterruptible while the function is executing, even when requested by the non-proprietary agent. For example, in cases in which the function for execution by the proprietary agent corresponds to a "phone call" or a "payment", interruption of this function is stipulated as being "not permitted", i.e. the function is stipulated as being uninterruptible.

As another example, in a case in which the function being executed by the proprietary agent corresponds to "weather and news acquisition" or "vehicle information acquisition", interruption of this function is stipulated as being "permitted", i.e. the function is stipulated as being interruptible. Moreover, in a case in which the function for execution by the proprietary agent is a "destination search", execution of this function is stipulated as being "on hold", meaning that a request from the non-proprietary agent will be placed on hold and will only become executable after this function has finished.

As illustrated in FIG. 2, the communication I/F 20E is an interface for connecting to the communication device 22. This interface may, for example, employ a CAN communication protocol. The communication I/F 20E is connected to an external bus 20H.

The input/output OF 20F is an interface for communicating with the touch panel 24, the speaker 26, and the microphone 28 installed in the vehicle 12. Note that the touch panel 24, the speaker 26, and the microphone 28 may be directly connected to the internal bus 20G.

The communication device 22 is a wireless communication module used to communicate with the proprietary server 14 and the non-proprietary server 16. The wireless communication module employs a communication protocol such as 5G, LTE, or Wi-Fi (registered trademark). The communication device 22 is connected to the network N.

The touch panel 24 is provided on an instrument panel or the like, and combines a liquid crystal display serving as a display section and a touch pad serving as an input section.

The speaker 26 is provided to the instrument panel, a center console, a front pillar, a dashboard, or the like, and is a device for outputting audio relating to the proprietary agent and the non-proprietary agent.

The microphone 28 is provided to the front pillar, dashboard, or the like of the vehicle 12, and is a device that picks up speech uttered by the user U, who is an occupant of the vehicle 12.

Figure 4:
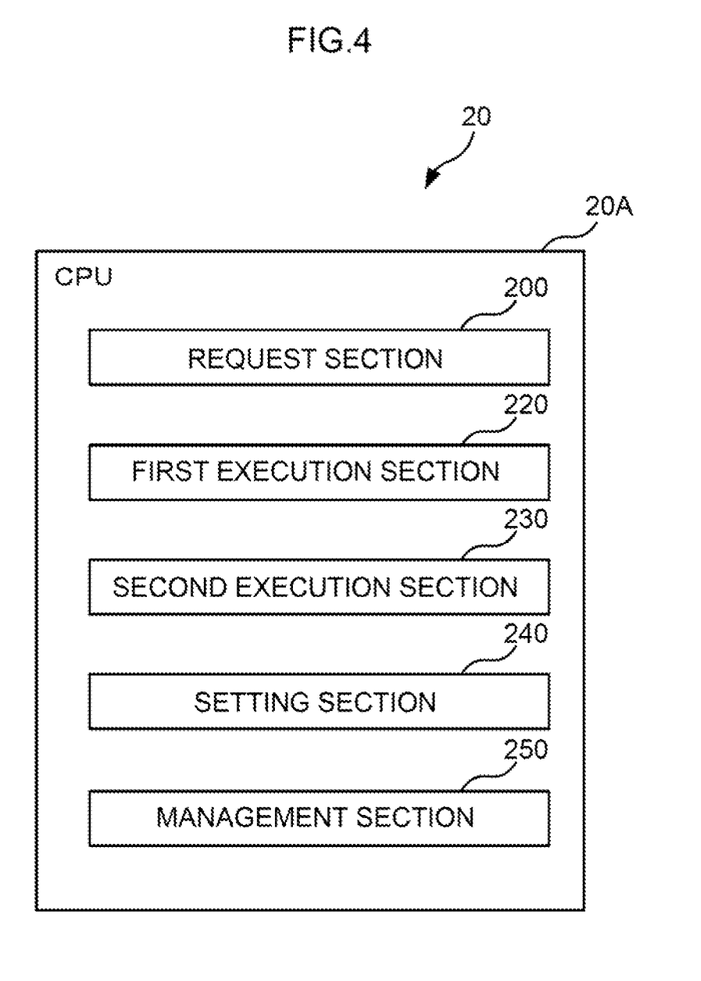
FIG. 4 is a block diagram illustrating a functional configuration of a head unit of the first exemplary embodiment.

In the head unit 20 of the present exemplary embodiment illustrated in FIG. 4, the CPU 20A executes the processing program 100 so as to function as a request section 200, a first execution section 220, a second execution section 230, a setting section 240, and a management section 250.

The request section 200 includes a function to request execution of an agent at a prescribed trigger. Examples of the "prescribed trigger" include an utterance from the user U into the microphone 28, or the pressing of a push-to-talk (PTT) switch (not shown) provided at a steering wheel or the like. In cases in which speech information from the utterance of the user U contains a wake-up word for the proprietary agent, the request section 200 transmits the speech information to the proprietary server 14 to request execution of the proprietary agent. Moreover, in cases in which the speech information from the utterance of the user U contains a wake-up word for the non-proprietary agent, the request section 200 transmits the speech information to the non-proprietary server 16 to request execution of the non-proprietary agent.

The first execution section 220 includes a function to execute the proprietary agent. The first execution section 220 executes the proprietary agent function based on intent information provided by the proprietary server 14 to which the speech information from the utterance was transmitted.

The second execution section 230 includes a function to execute the non-proprietary agent. The second execution section 230 executes the non-proprietary agent function based on intent information provided by the non-proprietary server 16 to which the speech information from the utterance was transmitted.

The setting section 240 includes a function to reference the interruptibility list 110 in order to set permissibility information regarding the executability of the respective agents. In the present exemplary embodiment, the permissibility information is an exclusivity flag, this being a flag that can be set to ON or OFF, The setting section 240 sets the exclusivity flag based on interruptibility for each function of the proprietary agent, as stipulated in the interruptibility list 110. More specifically, in cases in which a function of the proprietary agent is uninterruptible, at the start of execution of the function by the proprietary agent the setting section 240 sets the exclusivity flag to ON, and at the finish of the function sets the exclusivity flag to OFF.

The management section 250 includes a function to manage execution of the respective agents. In a case in which there is a request from the request section 200 for execution of the non-proprietary agent while the proprietary agent is executing and the exclusivity flag is ON, the management section 250 of the present exemplary embodiment performs management to cause the proprietary agent to continue without responding to the request to execute the non-proprietary agent.

Control Flow

Figure 5:
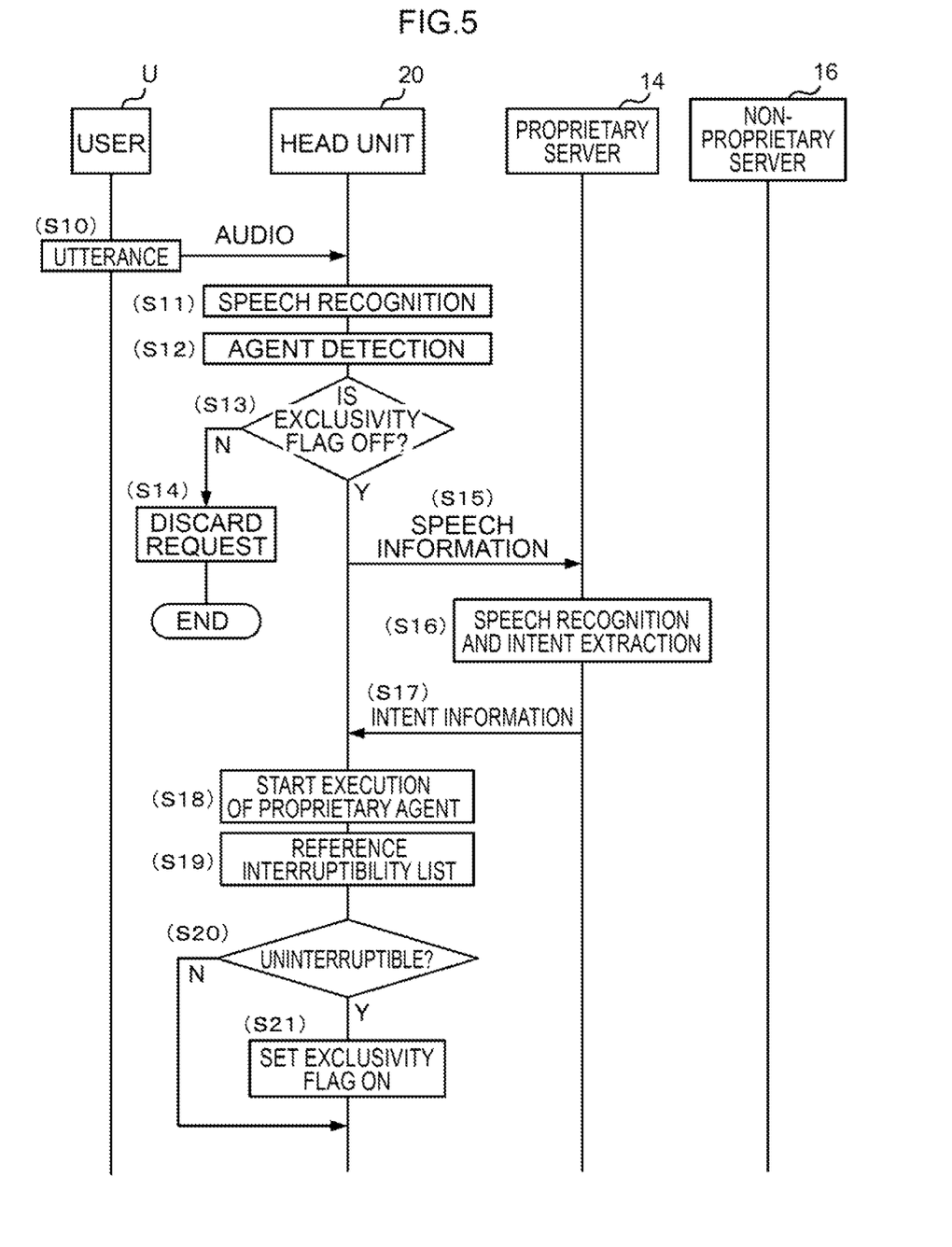
FIG. 5 is a sequence chart illustrating a flow of processing in an agent system of the first exemplary embodiment.
Figure 6:
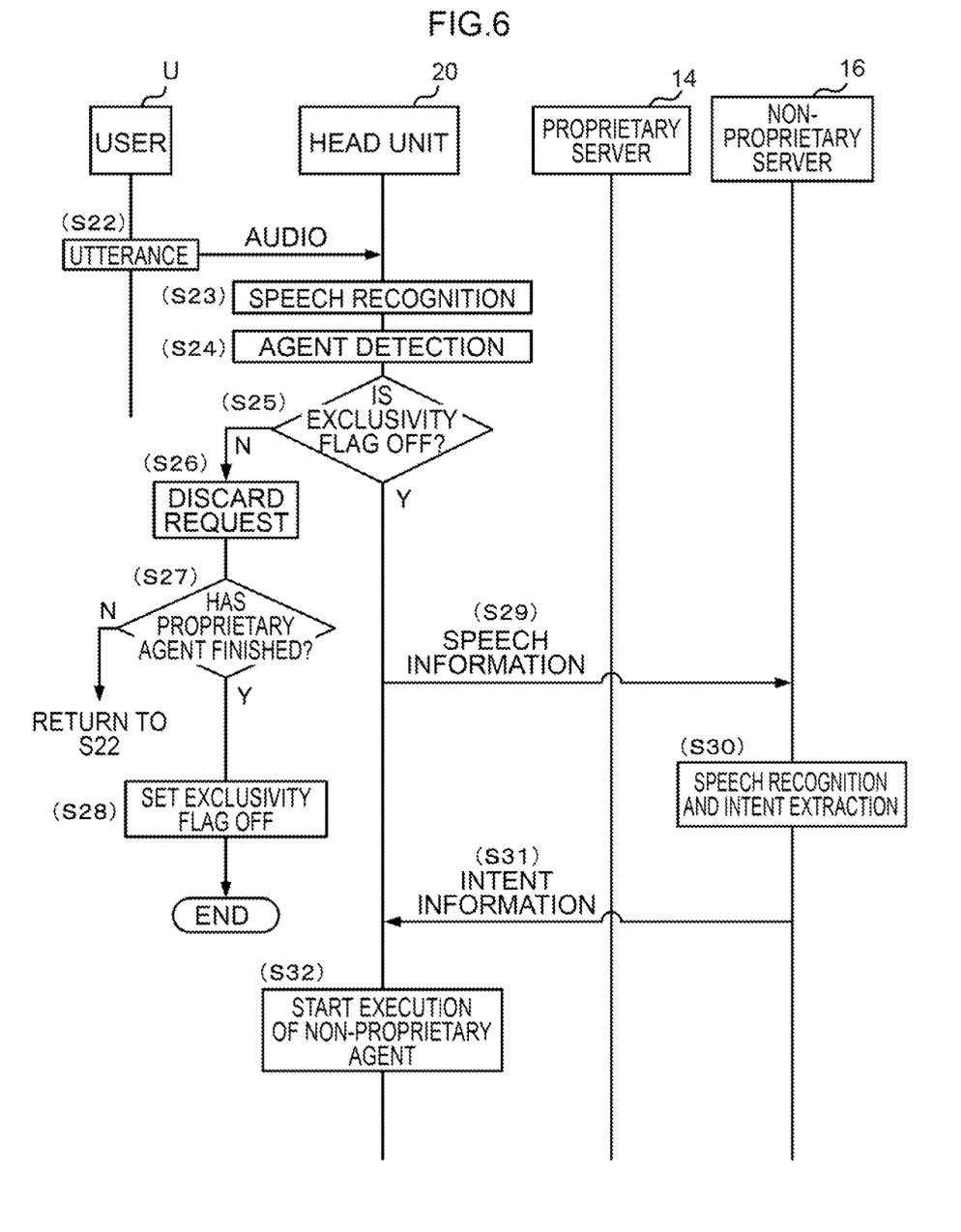
FIG. 6 is a sequence chart illustrating a flow of processing in an agent system of the first exemplary embodiment, in a continuation from FIG. 5.

Explanation follows regarding a flow of processing executed by the agent system 10 of the present exemplary embodiment, with reference to the sequence charts in FIG. 5 and FIG. 6. The processing of the head unit 20 is implemented by the CPU 20A functioning as the request section 200, the first execution section 220, the second execution section 230, the setting section 240, and the management section 250 described above.

At step S10 in FIG. 5, the user U utters something at the head unit 20. For example, user U makes a request to an agent by uttering something such as "Agent, call Bob" or "Assistant, play some music".

At step S11, the head unit 20 performs speech recognition on the utterance speech of the user U.

At step S12, the head unit 20 detects whether to start up the proprietary agent or the non-proprietary agent based on speech information from the speech recognition. For example, in cases in which the wake-up word "Agent" is present in the utterance speech, the head unit 20 detects the proprietary agent as the agent to start up. On the other hand, in cases in which the wake-up word "Assistant" is present in the utterance speech, the head unit 20 detects the non-proprietary agent as the agent to start up.

At step S13, the head unit 20 determines whether or not the exclusivity flag is OFF. Processing proceeds to step S14 in cases in which the head unit 20 has determined that the exclusivity flag is not OFF, i.e. is ON. On the other hand, processing proceeds to step S15 in cases in which the head unit 20 has determined that the exclusivity flag is OFF.

At step S14, the head unit 20 discards the request to the agent. The agent execution processing is then ended.

At step S15, the head unit 20 transmits the speech information to the server of the agent detected at step S12. FIG. 5 illustrates an example in which a request is made to the proprietary agent. In cases in which the user U has uttered "Agent, call Bob", speech information with the content "Call Bob" is transmitted to the proprietary server 14.

At step S16, the proprietary server 14 performs speech recognition based on the speech information that has been received, and executes intent extraction thereon. For example, the proprietary server 14 extracts an intent to make a phone call to Bob from the speech information "Call Bob".

At step S17, the proprietary server 14 transmits the extracted intent to the head unit 20 as intent information.

At step S18, the head unit 20 starts execution of the proprietary agent. Namely, on receipt from the proprietary server 14 of the intent information, which is to make a phone call to Bob, the head unit 20 starts up a phone call function, references contact details for Bob either acquired from the proprietary server 14 or stored in the storage 20D, and makes a phone call to Bob. A phone call is thereby started by the head unit 20.

At step S19, the head unit 20 references the interruptibility list 110. For example, as illustrated in FIG. 3, in cases in which the proprietary agent is performing a phone call, the information "not permitted" is acquired since the proprietary agent is uninterruptible.

At step S20 in FIG. 5, the head unit 20 determines whether or not the proprietary agent is uninterruptible. Processing proceeds to step S21 in cases in which the head unit 20 determines the proprietary agent to be uninterruptible. On the other hand, processing proceeds to step S22 of FIG. 6 in cases in which the head unit 20 determines the proprietary agent not to be uninterruptible.

At step S21, the head unit 20 sets the exclusivity flag to ON.

The processing from step S22 to step S26 of FIG. 6 is the same as the processing from step S10 to step S14 described above.

At step S27, the head unit 20 determines whether or not the proprietary agent has finished. Processing returns to step S22 in cases in which the head unit 20 has determined the proprietary agent not to have finished, namely in cases in which the proprietary agent is still executing. On the other hand, processing proceeds to step S28 in cases in which the head unit 20 has determined that the proprietary agent has finished.

At step S28, the head unit 20 sets the exclusivity flag to OFF. The agent execution processing is then ended.

In cases in which the exclusivity flag is determined to be OFF at step S25, at step S29 the head unit 20 transmits speech information to the server of the agent detected at step S24. FIG. 6 illustrates an example in which a request is made to the non-proprietary agent. In cases in which the user U has uttered "Assistant, play some music", speech information with the content "Play some music" is transmitted to the non-proprietary server 16.

At step S30, the non-proprietary server 16 performs speech recognition based on the speech information that has been received, and executes intent extraction thereon. For example, the non-proprietary server 16 extracts an intent to playback music from the speech information of "Play some music".

At step S31, the non-proprietary server 16 transmits the extracted intent to the head unit 20 as intent information.

At step S32, the head unit 20 starts execution of the non-proprietary agent.

The proprietary agent being executed is interrupted and ended when this occurs. For example, on receipt of the intent information to playback music from the non-proprietary server 16, the head unit 20 ends the proprietary agent being executed and plays back music received from the non-proprietary server 16.

First Exemplary Embodiment: Summary

The head unit 20 of the present exemplary embodiment is capable of executing plural agents including the proprietary agent and the non-proprietary agent. The interruptibility list 110 stipulating the interruptibility of each function executed by the proprietary agent is stored in the storage 20D of the head unit 20. Moreover, in the present exemplary embodiment, the request section 200 requests agent execution at a prescribed trigger, such as an utterance or PTT switch operation. The setting section 240 references the interruptibility list 110 in order to set the permissibility information relating to executability of the non-proprietary agent during execution of the proprietary agent by setting the exclusivity flag. The management section 250 manages so as to continue with the proprietary agent in cases in which there is a request to execute the non-proprietary agent while the proprietary agent is executing and the exclusivity flag is ON.

The head unit 20 of the present exemplary embodiment is capable of suppressing start up of the non-proprietary agent when execution of the proprietary agent is still ongoing, and suppressing the proprietary agent from being interrupted thereby.

Note that interrupting a phone call when a non-proprietary agent request occurs while the proprietary agent is executing a phone call would result in the forced interruption of the conversation. Moreover, interrupting payment processing when a non-proprietary agent request occurs while the proprietary agent is executing a payment might cause problems with the payment. To address such potential problems, the head unit 20 of the present exemplary embodiment is configured such that a function is uninterruptible if there is a need in the proprietary agent for continuity during execution of the function, such as for a phone call or a payment. Namely, the present exemplary embodiment suppresses interruption of a phone call while the proprietary agent is executing the phone call, and suppresses interruption of payment processing while the proprietary agent is executing payment processing.

The present exemplary embodiment also sets the exclusivity flag as permissibility information, thereby enabling centralized agent management for different functions by switching the exclusivity flag ON or OFF.

Second Exemplary Embodiment

In the first exemplary embodiment, a new agent execution request is discarded in cases in which the exclusivity flag is ON. However, in contrast thereto, a second exemplary embodiment is configured such that a new agent execution request is placed on hold in cases in which the exclusivity flag is ON. Explanation follows regarding points that differ from the first exemplary embodiment. Note that other configuration is similar to that of the first exemplary embodiment, and so detailed explanation thereof is omitted.

The management section 250 of the present exemplary embodiment places a request for execution of the non-proprietary agent on hold and allows the proprietary agent to continue in cases in which there is a request for execution of the non-proprietary agent from the request section 200 while the proprietary agent is executing and the exclusivity flag is ON. Then, the management section 250 executes the request for the non-proprietary agent that has been placed on hold after execution has finished for the proprietary agent that was allowed to continue execution.

Figure 7:
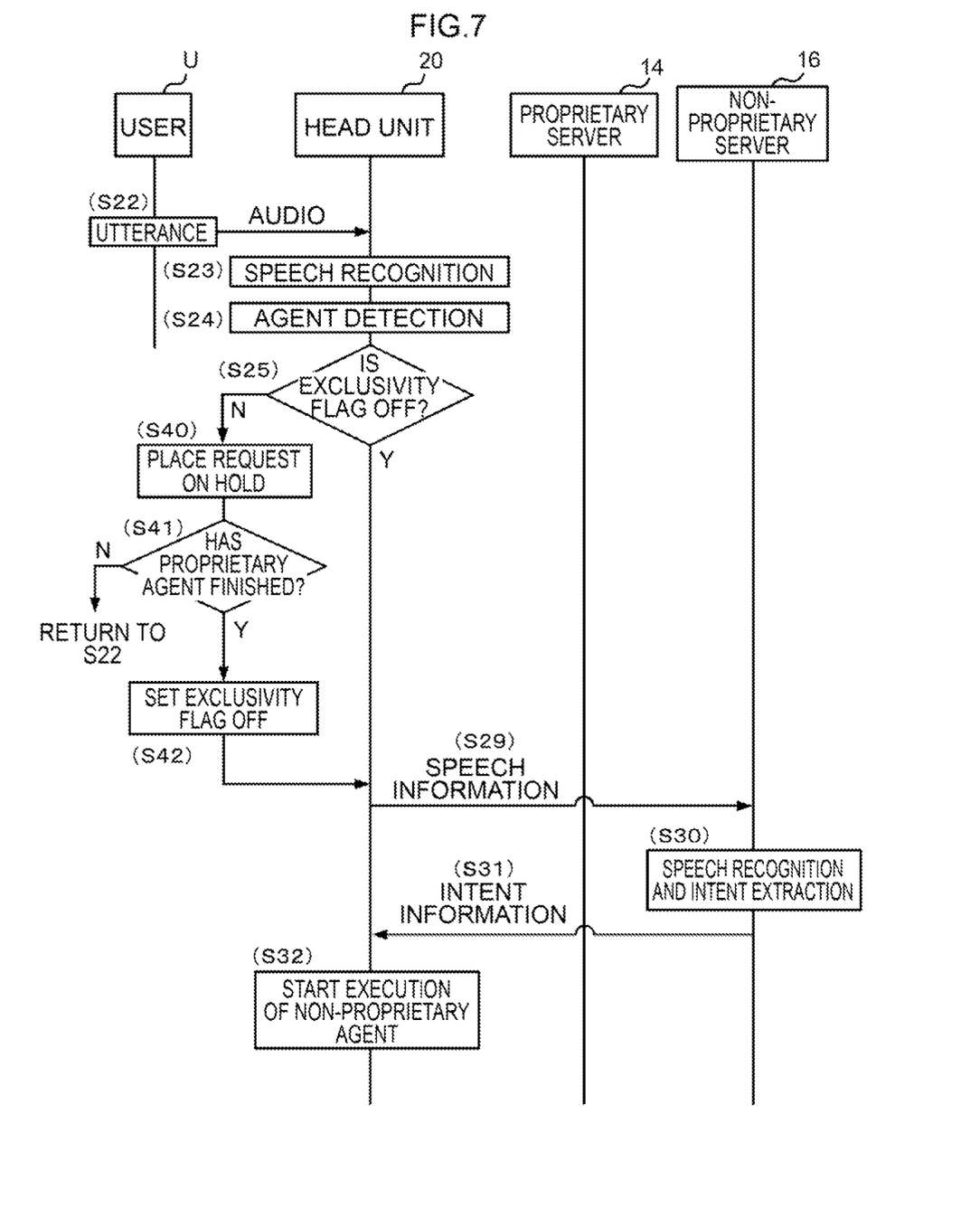
FIG. 7 is a sequence chart illustrating a flow of processing in an agent system of a second exemplary embodiment.

FIG. 7 illustrates points of difference to the first exemplary embodiment in processing executed in the agent system 10 of the present exemplary embodiment. Namely, the processing from step S40 to step S42 is executed instead of the processing from step S26 to step S28 of FIG. 6.

At step S40, the head unit 20 places the request for the agent on hold in cases in which determination at step S25 is that the exclusivity flag is not OFF.

At step S41, the head unit 20 determines whether or not the proprietary agent has finished. Processing returns to step S22 in cases in which the head unit 20 has determined the proprietary agent has not finished, namely in cases in which the proprietary agent is still executing. On the other hand, processing proceeds to step S42 in cases in which the head unit 20 has determined the proprietary agent has finished.

At step S42, the head unit 20 sets the exclusivity flag to OFF. Processing then proceeds to step S29.

Note that the request for the agent that was placed on hold at step S40 is reflected in step S29 to step S32. Accordingly, execution of the non-proprietary agent that has been placed on hold is started at step S32.

Second Exemplary Embodiment: Summary

The head unit 20 of the second exemplary embodiment is configured so as not to discard execution requests for the non-proprietary agent even in cases in which the non-proprietary agent is not executable during execution of the proprietary agent, and to instead place such requests on hold. The present exemplary embodiment accordingly enables the non-proprietary agent to be executed after the proprietary agent has finished, without re-requesting the non-proprietary agent.

Third Exemplary Embodiment

In the first exemplary embodiment, whether or not to interrupt a function is determined for each function executed by the proprietary agent. In contrast thereto, in a third exemplary embodiment, whether or not to interrupt a function during execution is determined according to an execution status of the proprietary agent. Explanation follows regarding points of difference from the first exemplary embodiment. Note that other configuration is similar to that of the first exemplary embodiment, and detailed explanation thereof is omitted.

Figure 8:
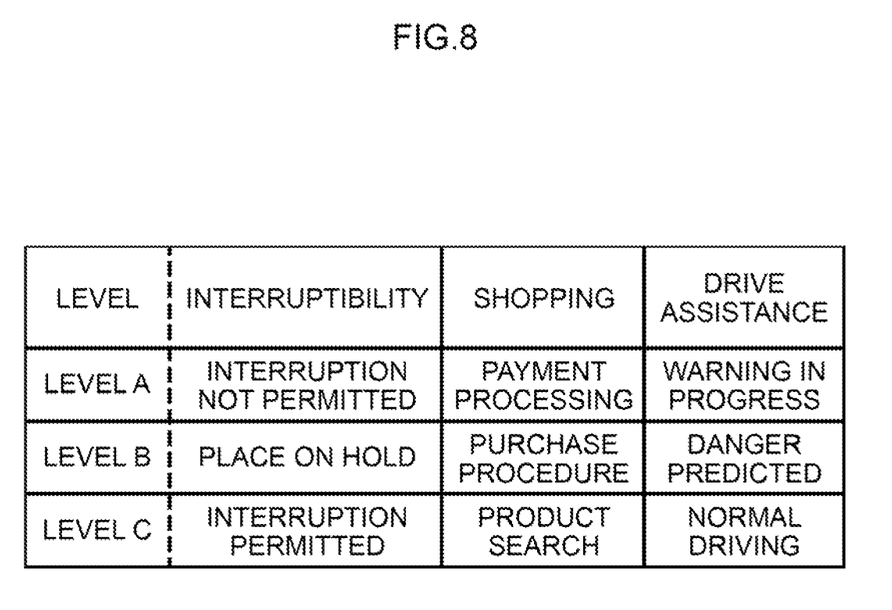
FIG. 8 is a diagram illustrating content of an interruptibility list of a third exemplary embodiment.

The interruptibility list 110 of the present exemplary embodiment is a list stipulating interruptibility of the proprietary agent for a level that depends on the execution status of the proprietary agent. As illustrated in FIG. 8, the interruptibility list 110 lists execution statuses for each function of the proprietary agent, a level corresponding to each execution status, and stipulates information regarding uninterruptibility associated with the levels.

For example, in cases in which the proprietary agent function is "shopping", stipulated levels are level A indicating processing to be uninterruptable during payment processing, level B indicating execution of the non-proprietary agent to be placed on hold during a purchase procedure, and a level C indicating processing to be interruptible during a product search. Moreover, for example, in cases in which the proprietary agent function is "drive assistance", stipulated levels are level A indicating processing to be uninterruptable during a warning, level B indicating execution of the non-proprietary agent to be placed on hold while danger is predicted, and level C indicating processing to be implemented while in a normal state.

In the present exemplary embodiment, levels that change according to the execution status of the proprietary agent are employed as the permissibility information. The setting section 240 configures the settings such that the non-proprietary agent is not executable in cases in which the level of the proprietary agent being executed exceeds a set threshold level, and configures the settings such that the non-proprietary agent is executable in cases in which the level of the proprietary agent being executed does not exceed the threshold level.

In the present exemplary embodiment, settings are configured such that level A is the highest level, level B and level C are progressively lower levels, and level B is set as the threshold. The present exemplary embodiment is accordingly configured such that the non-proprietary agent is not executable in cases in which the level exceeds level B; namely, the non-proprietary agent is not executable at level A.

Control Flow

Figure 9:
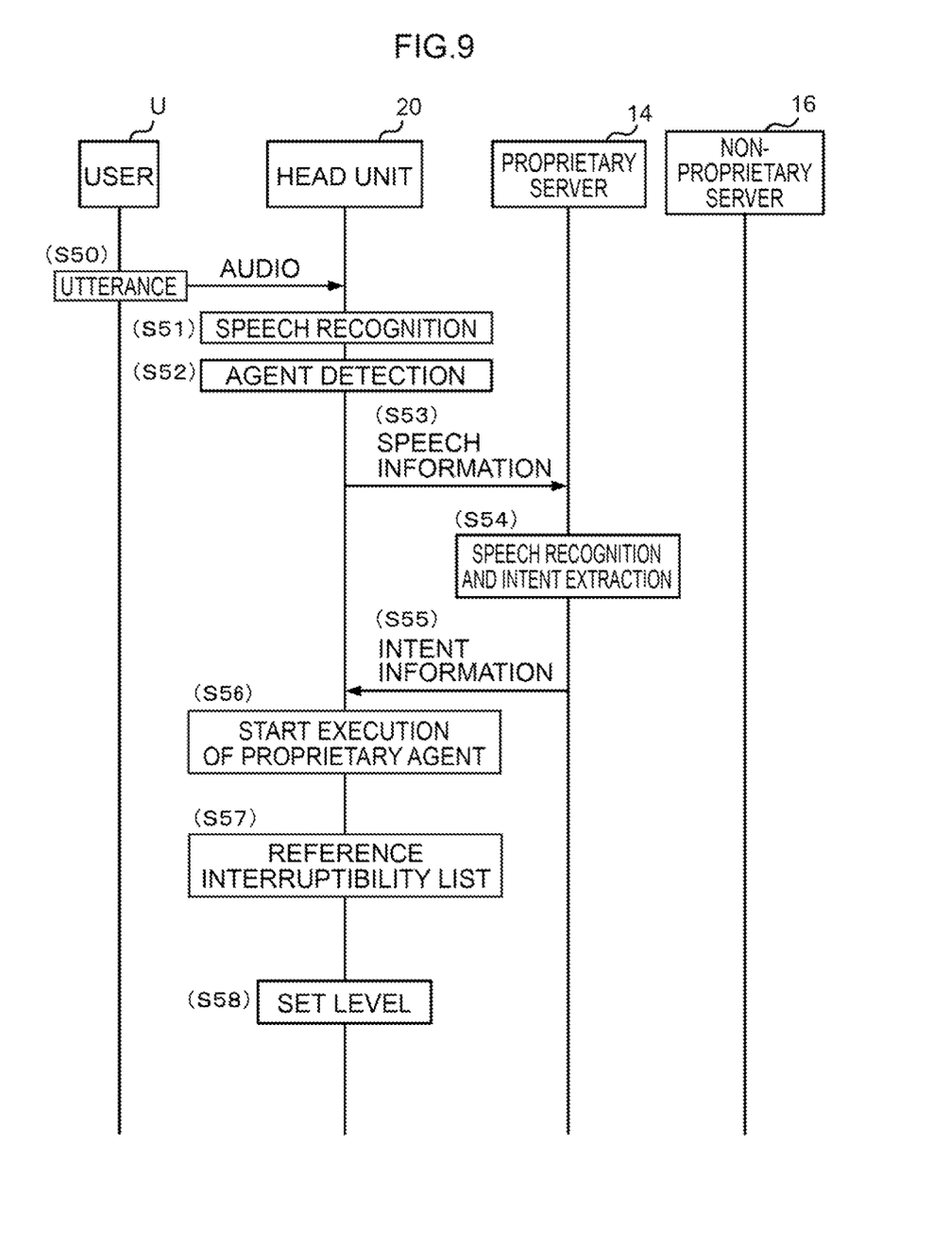
FIG. 9 is a sequence chart illustrating a flow of processing in an agent system of the third exemplary embodiment.
Figure 10:
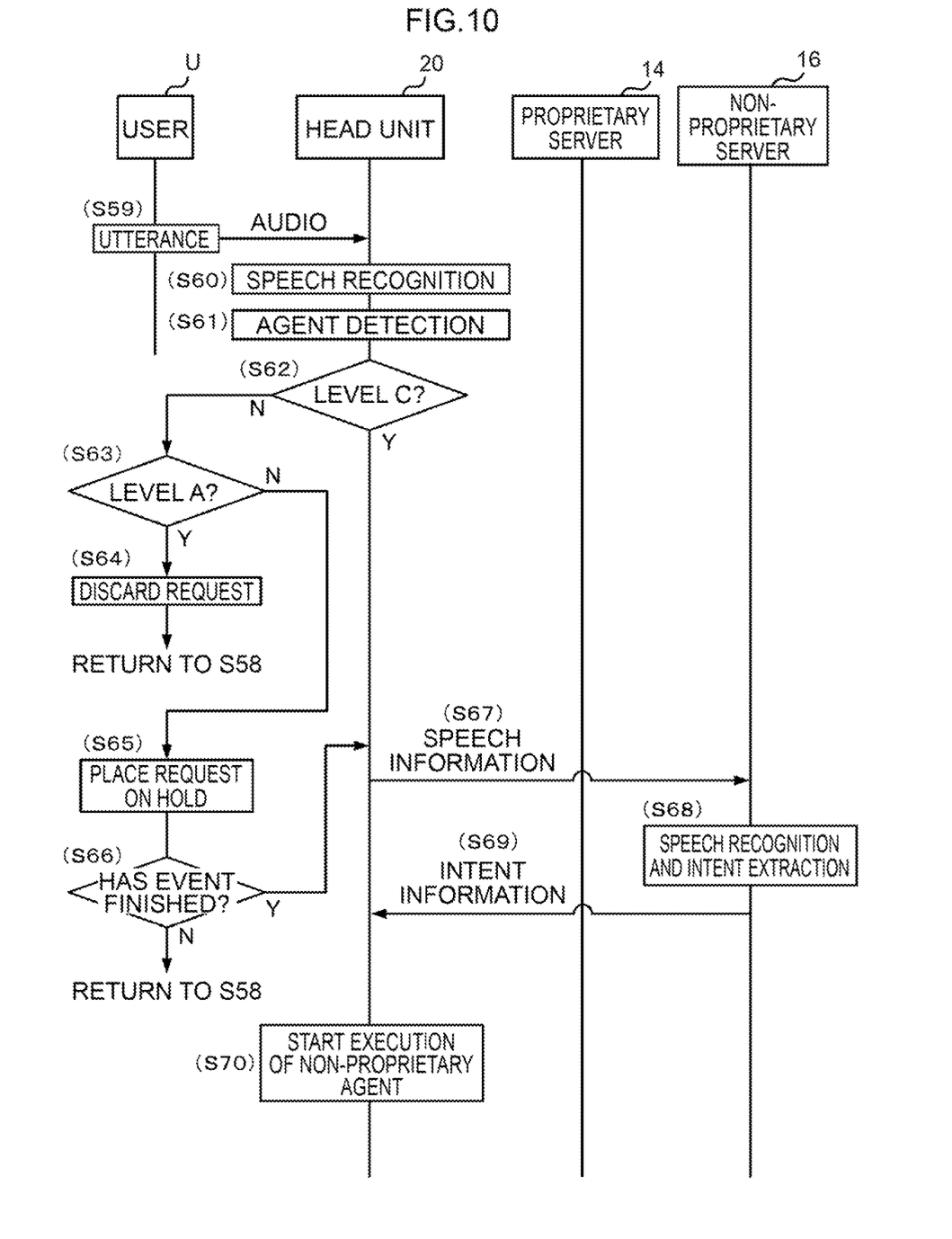
FIG. 10 is a sequence chart illustrating a flow of processing in an agent system of the third exemplary embodiment, in a continuation from FIG. 9.

Explanation follows regarding a flow of processing executed by the agent system 10 of the present exemplary embodiment, with reference to the sequence charts of FIG. 9 and FIG. 10.

The processing from step S50 to step S52 in FIG. 9 is the same as the processing from step S10 to step S12 described above, and the processing from step S53 to step S56 is the same as the processing from step S15 to step S18 described above.

At step S57, the head unit 20 references the interruptibility list 110. For example, in cases in which the proprietary agent is performing shopping, level information is acquired corresponding to each execution status, namely product search, purchase procedure, or payment processing.

At step S58, the head unit 20 sets the level according to the execution status of the proprietary agent.

The processing from step S59 to step S61 in FIG. 10 is the same as the processing from step S22 to step S24 described above.

At step S62, the head unit 20 determines whether or not the level that has been set is level C. Processing proceeds to step S63 in cases in which the head unit 20 has determined the level set as not being level C. On the other hand, processing proceeds to step S67 in cases in which the head unit 20 has determined the level set as being level C.

At step S63, the head unit 20 determines whether or not the level that has been set is level A. Processing proceeds to step S65 in cases in which the head unit 20 has determined the level set as not being level A. On the other hand, processing proceeds to step S64 in cases in which the head unit 20 has determined the level set as being level A.

At step S64, the head unit 20 discards the request for the agent. Processing then returns to step S58. Namely, the head unit 20 resets the level according to the execution status.

In cases in which determination at step S62 is that the set level is not level C and determination at step S63 is made that the set level is not level A, namely in cases in which the set level is determined to be level B, the head unit 20 places the request for the agent on hold at step S65.

At step S66, the head unit 20 determines whether or not an event of the proprietary agent being performed when a request was placed on hold has now finished. Processing returns to step S58 in cases in which the head unit 20 has determined that the event of the proprietary agent is not yet finished. Namely, the head unit 20 resets the level according to the execution status. On the other hand, processing proceeds to step S67 in cases in which the head unit 20 has determined that the event of the proprietary agent has finished.

The processing from step S67 to step S70 in FIG. 10 is the same as the processing from step S29 to step S32 described above.

Third Exemplary Embodiment: Summary

The agent control device of the third exemplary embodiment sets executability of the non-proprietary agent with a level that changes depending on the execution status of the proprietary agent. Namely, the present exemplary embodiment is able to manage interruptibility according to the execution status of a function an agent is executing.

Remarks

In the exemplary embodiments described above, execution of the non-proprietary agent is controlled based on the execution status of the proprietary agent as stored in the interruptibility list 110, however, there is no limitation thereto. Namely, an execution status of the non-proprietary agent may be stored in the interruptibility list 110, and execution of the proprietary agent controlled based on the execution status of the non-proprietary agent.

The head unit 20 in the second and third exemplary embodiments is configured so as to be able to place a request for the non-proprietary agent on hold, and the request being held is transmitted to the non-proprietary server 16 as speech information at a stage when the proprietary agent has finished. However, there is no limitation thereto, and a configuration may be adopted in which in cases in which the head unit 20 has discarded a non-proprietary agent request, the user U may be asked to reaffirm this request when the proprietary agent has finished; namely, the user U may then be prompted to make an utterance.

Note that in the exemplary embodiments described above, the various processing executed by the CPU 20A reading software (a program) may be executed by various types of processor other than the CPU. Such processors include programmable logic devices (PLD) that allow circuit configuration modification post-manufacture, such as a field-programmable gate array (FPGA), and dedicated electric circuits, these being processors including a custom-designed circuit configuration for executing specific processing, such as an application specific integrated circuit (ASIC). The above-described various processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the exemplary embodiments described above, explanation has been given of cases in which respective programs are pre-stored (installed) on a computer-readable non-transitory recording medium. For example, the processing program 100 of the head unit 20 is pre-stored in the storage 20D. However, there is no limitation thereto, and the respective programs may be provided in a format recorded on a non-transitory recording medium such as a compact disc read only memory (CD-ROM), digital versatile disc read only memory (DVD-ROM), or universal serial bus (USB) memory. Alternatively, the programs may be in a form downloaded from an external device over a network.

The processing flows in the exemplary embodiments described above are merely examples thereof, and unnecessary steps may be removed, new steps may be added, or the processing sequence may be changed within a range not departing from the spirit thereof.

What is claimed is:

1. An agent control device configured to execute a plurality of agents and including a processor, the processor being configured to:
    request execution of each of the agents at a prescribed trigger;
    store an interruptibility list that stipulates interruptibility of execution for each function of a given agent being executed or for an execution status of the given agent;
    reference the interruptibility list in order to set permissibility information relating to executability of another one of the agents in conjunction with execution of the given agent; and
    perform management such that, in a case in which there is a request for execution of the other agent while the given agent is executing and the permissibility information indicates that the other agent is not executable, execution of the given agent continues without responding to the request,
    wherein:
    an indicator of uninterruptibility is stipulated in the interruptibility list for a function of the given agent requiring continuity; and
    the processor is configured to set the permissibility information at a start of execution of an uninterruptible function in the interruptibility list such that the other agent is not executable, and to set the permissibility information at a finish of execution of the uninterruptible function such that the other agent is executable.

2. The agent control device of claim 1, wherein, in a case in which there is a request for execution of the other agent while the given agent is executing and the permissibility information indicates that the other agent is not executable, the processor places the request on hold, allows the given agent to continue, and causes execution of the other agent in response to the request that was placed on hold after execution has finished for the given agent that was allowed to continue executing.

3. The agent control device of claim 2, wherein, in a case in which the request is placed on hold and the given agent has been allowed to continue, the processor seeks reaffirmation of the request that was placed on hold after execution has finished for the given agent that was allowed to continue executing.

4. An agent control device configured to execute a plurality of agents and including a processor, the processor being configured to:
    request execution of each of the agents at a prescribed trigger;
    store an interruptibility list that stipulates interruptibility of execution for each function of a given agent being executed or for an execution status of the given agent;
    reference the interruptibility list in order to set permissibility information relating to executability of another one of the agents in conjunction with execution of the given agent; and
    perform management such that, in a case in which there is a request for execution of the other agent while the given agent is executing and the permissibility information indicates that the other agent is not executable, execution of the given agent continues without responding to the request,
    wherein the permissibility information is configured by a flag, and interruptibility is stipulated for each function of the given agent in the interruptibility list.

5. An agent control device configured to execute a plurality of agents and including a processor, the processor being configured to:
    request execution of each of the agents at a prescribed trigger;
    store an interruptibility list that stipulates interruptibility of execution for each function of a given agent being executed or for an execution status of the given agent;
    reference the interruptibility list in order to set permissibility information relating to executability of another one of the agents in conjunction with execution of the given agent; and
    perform management such that, in a case in which there is a request for execution of the other agent while the given agent is executing and the permissibility information indicates that the other agent is not executable, execution of the given agent continues without responding to the request,
    wherein the permissibility information is configured by a level that changes according to the execution status of the given agent, and interruptibility is stipulated according to the level in the interruptibility list.

* * * * *